April 16, 1968 C. A. ANDERSON ETAL 3,377,963
SANDWICH-MAKING MACHINE
Filed July 21, 1966 8 Sheets-Sheet 1

INVENTORS
CURTIS A. ANDERSON &
CHARLES W. SYAK
BY
W.B.Harpman
ATTORNEY

INVENTORS
CURTIS A. ANDERSON &
CHARLES W. SYAK
BY
W.B. Hampman
ATTORNEY

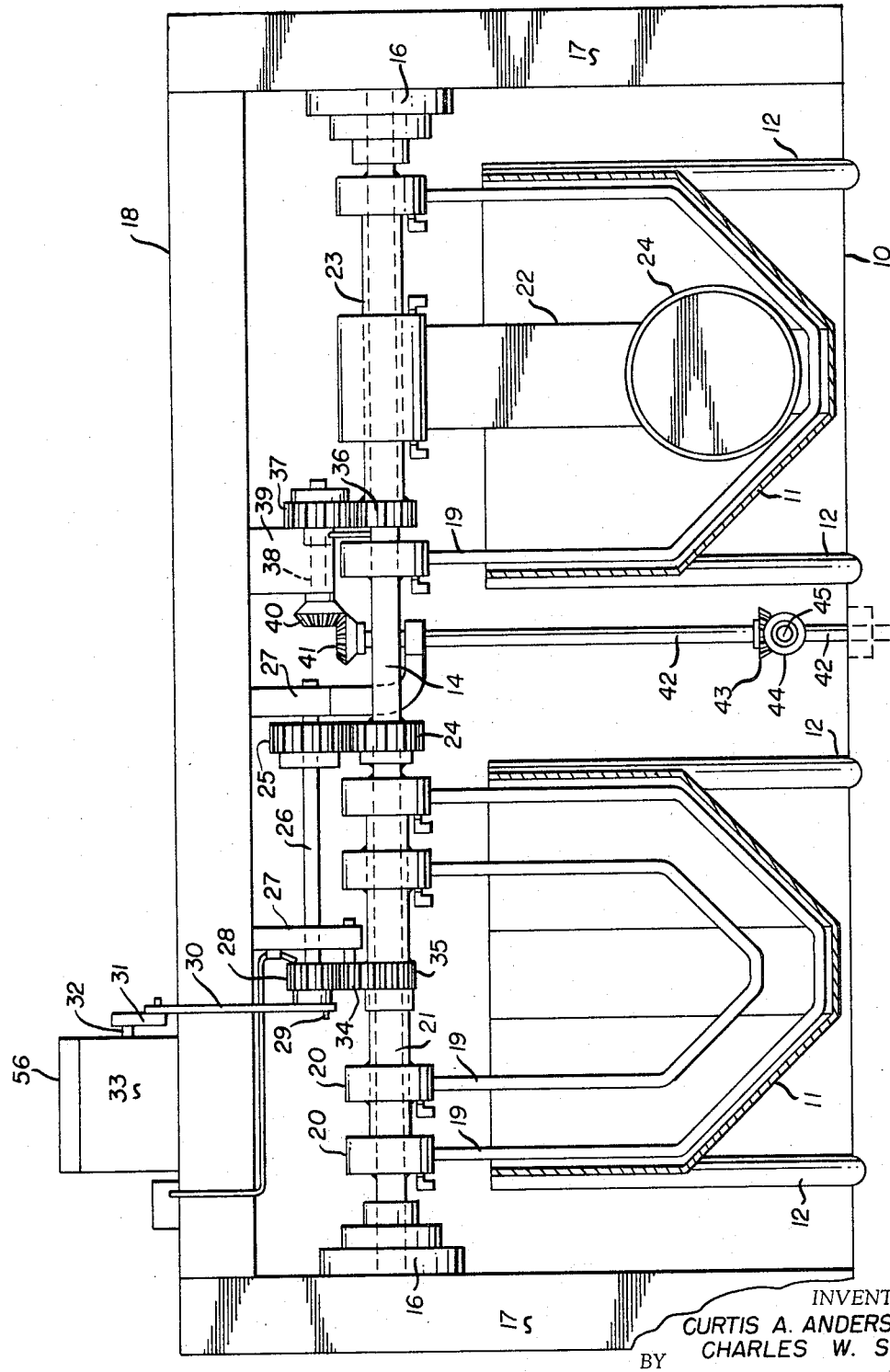

April 16, 1968     C. A. ANDERSON ETAL     3,377,963
SANDWICH-MAKING MACHINE

Filed July 21, 1966                                                8 Sheets-Sheet 4

INVENTORS
CURTIS A. ANDERSON &
CHARLES W. SYAK
BY
*W.B.Harpman*
ATTORNEY

INVENTORS
CURTIS A. ANDERSON &
CHARLES W. SYAK
BY
ATTORNEY

April 16, 1968  C. A. ANDERSON ET AL  3,377,963
SANDWICH-MAKING MACHINE
Filed July 21, 1966  8 Sheets-Sheet 7

INVENTORS
CURTIS A. ANDERSON &
CHARLES W. SYAK
BY
*W. B. Harpman*
ATTORNEY

April 16, 1968 C. A. ANDERSON ETAL 3,377,963
SANDWICH-MAKING MACHINE
Filed July 21, 1966 8 Sheets-Sheet 8

INVENTORS
CURTIS A. ANDERSON &
BY CHARLES W. SYAK

W. B. Hampman
ATTORNEY

United States Patent Office 3,377,963
Patented Apr. 16, 1968

3,377,963
SANDWICH-MAKING MACHINE
Curtis A. Anderson, San Clemente, Calif., and Charles W. Syak, Girard, Ohio, assignors to Trumbull Development Corporation, Girard, Ohio, a corporation of Ohio
Filed July 21, 1966, Ser. No. 566,905
8 Claims. (Cl. 107—1)

This invention relates to a food dispensing device and more particularly to a machine which will prepare sandwiches such as hamburgers and deliver them complete and ready to be served.

The principal object of the invention is the provision of a machine for making sandwiches which includes means for cooking the sandwich filling, maintaining it in suitably heated, ready to serve condition, shaping it into a desirable shape and inserting it into a hamburger bun or the like.

A further object of the invention is the provision of a sandwich making machine which will cook loose type sandwich fillings such as ground beef, flaked fish, ground pork and barbeque recipe means, form serving portions trade have required the manual preparation of the meat of the precut buns in a continuous automatic cycling of the necessary steps.

A still further object of the invention is the provision of a machine for making sandwiches and particularly hamburger sandwiches wherein all parts of the machine which are in contact with the sandwich meat are removable and replaceable with clean parts.

A still further object of the invention is the provision of a machine for making sandwiches and particularly hamburger sandwiches which is of compact design, occupies a relatively small area and operates efficiently and automatically for the intended purpose.

A still further object of the invention is the provision of a sandwich forming machine which cooks sandwich meat in suitable receptacles in particle form and agitates the meat while it is being cooked and subsequently gathers the cooked meat into a suitable form and compacts it into a meat patty which is then delivered to a previously sliced bun or the like.

Sandwiches and particularly hamburger sandwiches heretofore made and sold in the restaurants and drive-in trade have required the manual preparation of the meat filling which is usually ground beef in the case of hamburger sandwiches by the shaping of the same and cooking the shaped meat patty and subsequently assembling the cooked meat patty into a hamburger bun or the like. The present invention relates to a machine which effectively and efficiently produces cooked properly prepared hamburger sandwiches from uncooked bulk meat supplies and previously sliced hamburger buns.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawings wherein:

FIGURE 3 is an enlarged vertical section on line 3—3 of FIGURE 1 and illustrating the meat cooking and holding pans and the agitator and meat shaping devices engaged therein.

Figure 1:
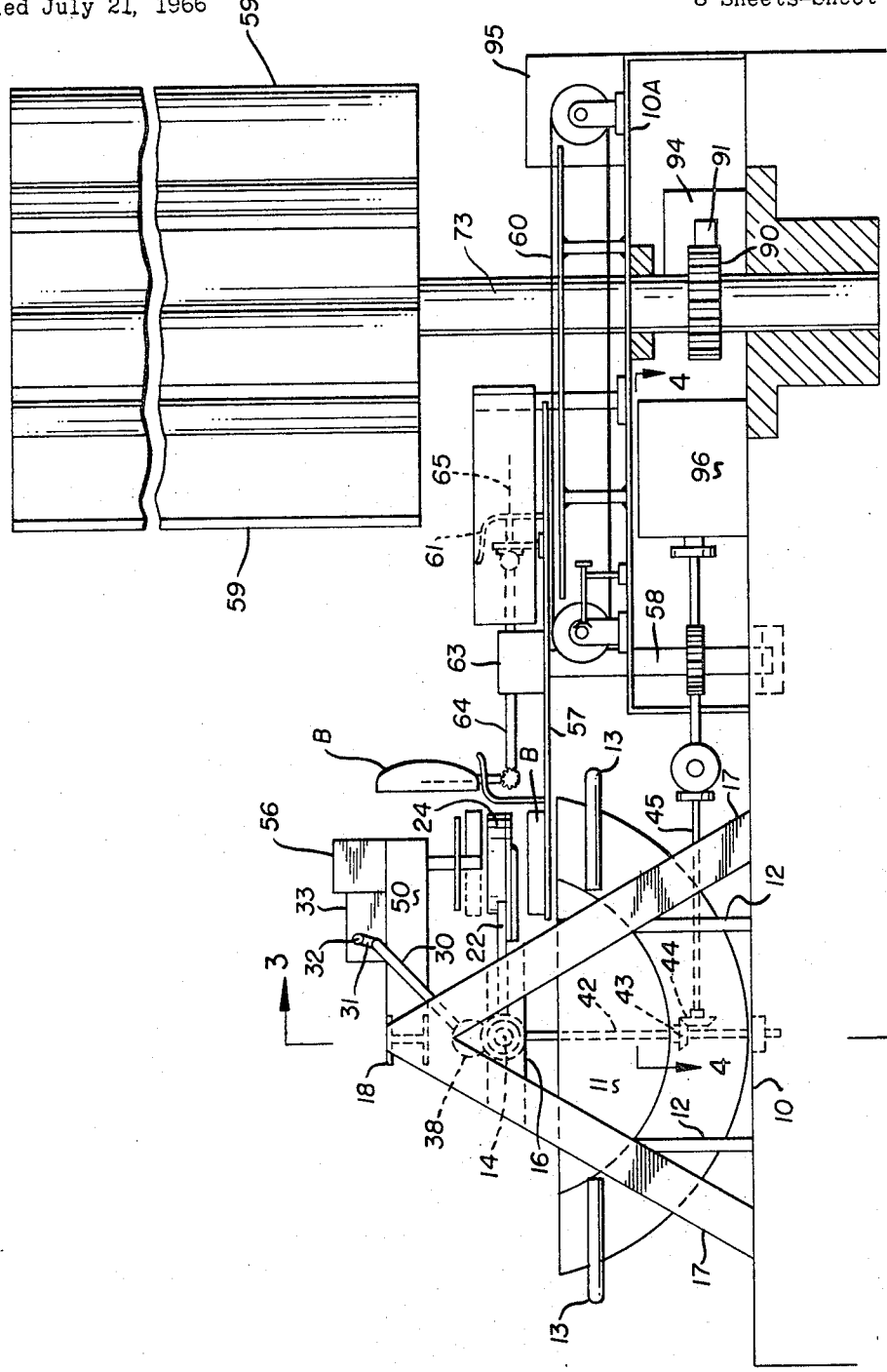
FIGURE 1 is a side elevation of the sandwich making machine with parts broken away.
Figure 2:
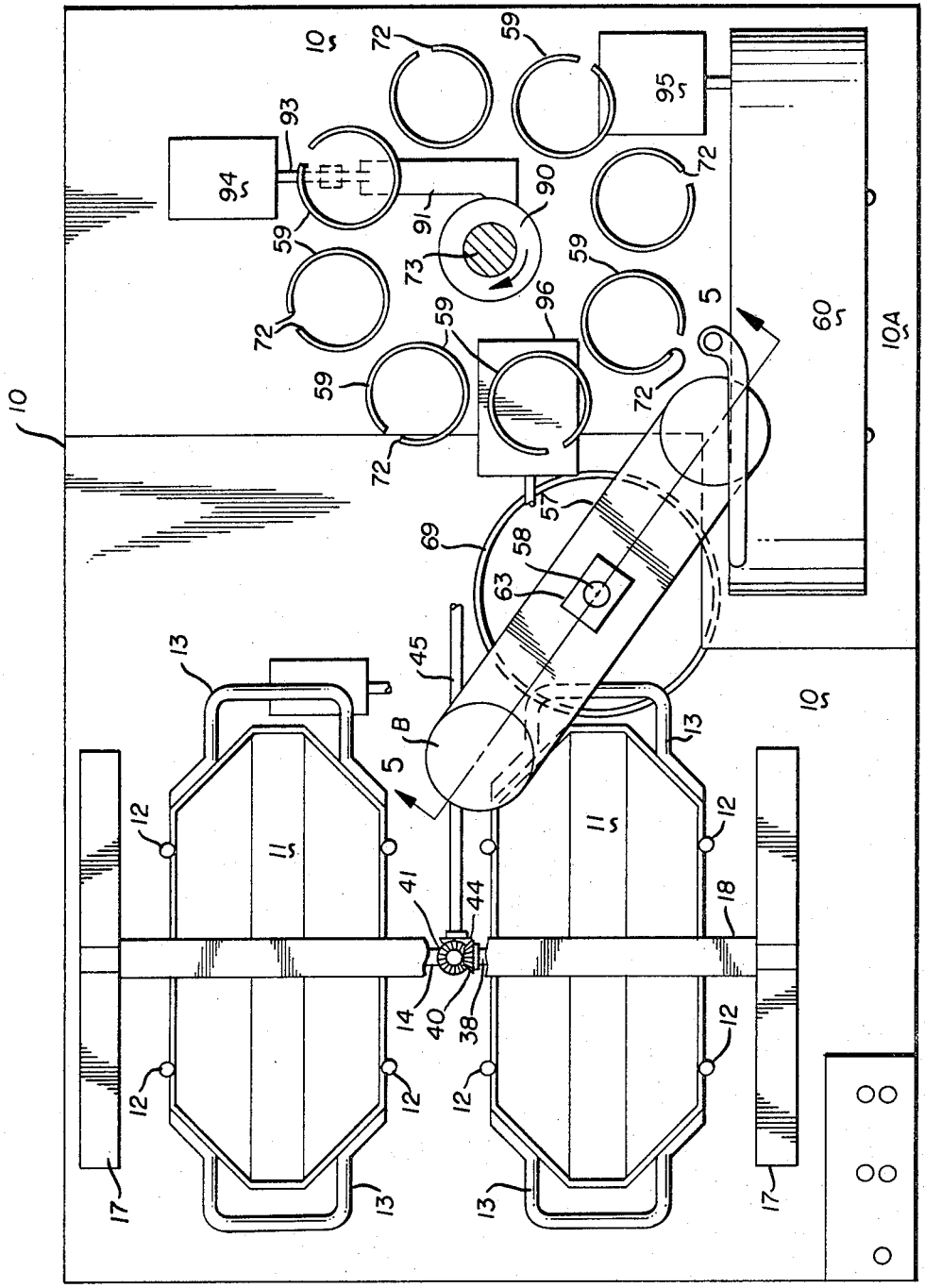
FIGURE 2 is a top plan view of the sandwich making machine.
Figure 7:
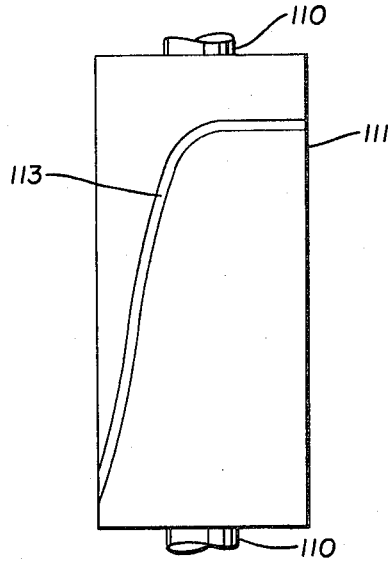
FIGURE 7 is a side elevation of a cam cylinder seen in FIGURE 4 of the drawings.

By referring to the drawings, FIGURES 1 and 2 in particular, it will be seen that the sandwich making machine comprises a suitable support base 10 on the upper surface of which the various component parts of the sandwich making machine are assembled. A pair of meat pans 11 provided with legs 12 and handles 13 are identical in shape and positioned on the supporting base 10 in registering relation thereto and beneath an elevated transversely extending shaft 14 which is journalled at its opposite ends in suitable bearings 16 carried on triangular frames 17. The triangular frames 17 are spaced by a transverse frame member 18 which is positioned above and parallel with the shaft 14.

By referring to FIGURES 1, 2 and 3 of the drawings, it will be seen that the meat pans 11 have their bottom portions in the shape of arcs and are provided with sloping sides relative thereto and that they are positioned with respect to the shaft 14 so that stirring rods 19 of an overall configuration comparable with the cross sectional shapes of pans 11 and secured to fittings 20 on the shaft 14 may move back and forth through the pans in an arcuate motion based on the shaft 14. It will be observed by referring to FIGURE 3 of the drawings in particular that two of the stirring rods 19 are attached directly to the shaft 14 and another is secured to a sleeve 21 which is rotatably positioned on the shaft 14 and arranged to be driven in an opposite rotary motion as compared with the shaft 14 as hereinafter described. A swinging meat scoop including an arm 22 is positioned in one of the pans 11 and is similarly secured to a secondary sleeve 23 on the shaft 14 which is arranged for independent control. The arm 22 has a circular scoop portion 24 on its lowermost end which will move back and forth in an arcuate path based on the shaft 14 and adjacent the lower portion of the pan 11. It will thus be seen that two of the meat pans 11 are provided, that one, the one on the left as seen in FIGURE 3 is provided with two of the rod like stirrers 19 and this pan 11 is used to cook the meat as it is provided with suitable heating means (not shown). The other pan 11, the one on the right in FIGURE 3, contains cooked meat and the heating means therefor merely serves to maintain the meat in suitably heated condition. The pan 11 in the position on the right as seen in FIGURE 3 of the drawings acts as the serving pan in which one of the stirring rods 19 is engaged together with the meat scoop 24. It will be observed that the pans 11 are interchangeable and that when the uncooked meat is first positioned in one of the pans 11 it is placed in the first position, to the left in FIGURE 3, where the meat is cooked while constantly stirred by the oppositely moving stirring rods 19 and that when the meat is cooked the pan 11 with the cooked meat in it is then transferred to the right of the machine as seen in FIGURE 3 of the drawings where the meat is again agitated by the stirring rod 19 and picked up as required by the scoop 24.

In order that the stirring rods 19 can be moved in the reciprocal motion in the pans 11 means is provided for rotating the shaft 14 in an alternate back and forth rotary motion and the means comprises a gear 24 secured to the shaft 14 and registering with a matching gear 25 positioned thereabove and secured to a shaft 26. The shaft 26 is journalled on suitable bearings in a pair of spaced depending brackets 27 secured to the transverse beam 18. The transverse shaft 26 has a second gear 28 thereon alongside a crank 29 which is engaged upon a connecting rod 30 which in turn is driven by a secondary crank 31 on the end of a drive shaft 32 of an electric motor 33. The electric motor 33 is mounted on the transverse beam 18. The second gear 28 on the transverse shaft 26 engages an idler 34 also carried by one of the brackets 27 and the idler 34 in turn engages a gear 35 on the sleeve 21 which is rotatably positioned on the shaft 14 above one of the pans 11. As hereinbefore described, one of the stirring rods 19 is secured to the sleeve 21 and it will, therefore, move in one reciprocal motion while the stirring rod 19 adjacent thereto and engaging the same pan 11 will move in an opposite reciprocal motion as it is secured to the shaft 14.

Figure 4:
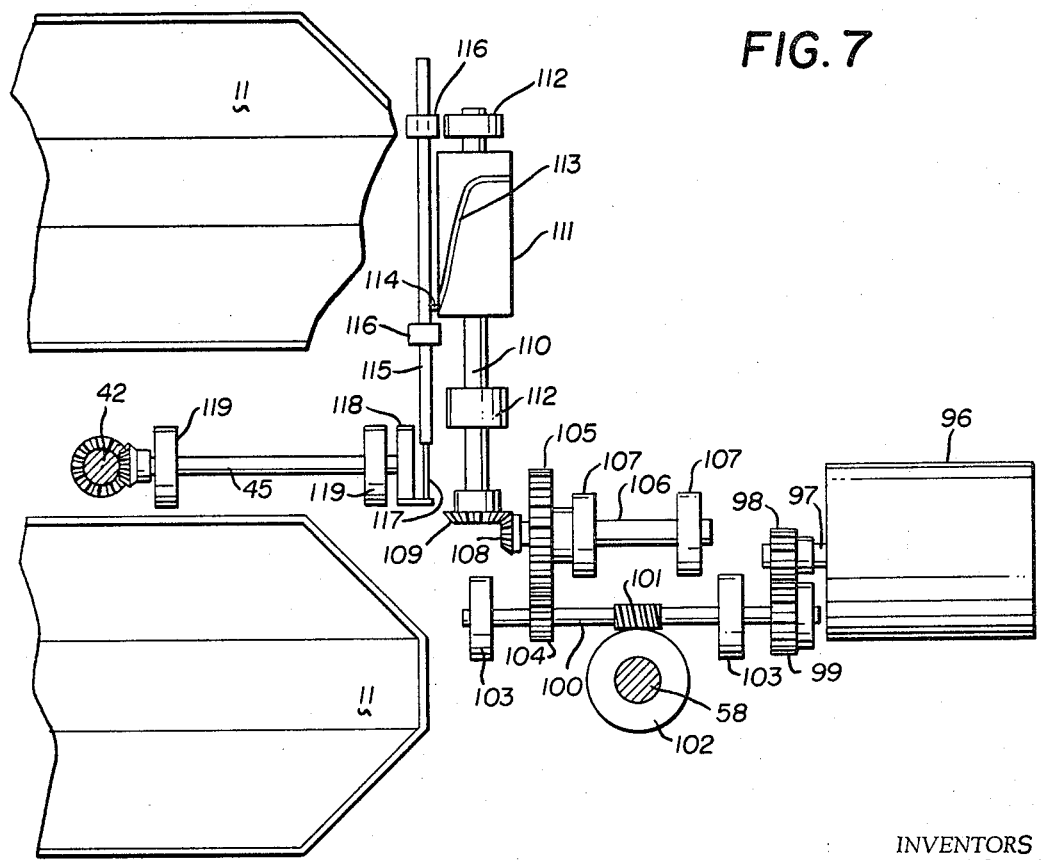
FIGURE 4 is a horizontal section on line 4—4 of FIGURE 1 and illustrates the drive means for the sandwich making machine.

It will further be seen that the shaft 14 also directly drives the stirring rod 19 in the other one of the pans 11 and it will thus be seen that the two stirring rods 19 in the one pan 11 move in opposite reciprocal motion while the stirring rod 19 in the other of the pans 11 also moves in a reciprocal motion. The meat scoop 24 is moved as desired to pick up meat and form a meat patty by separate driving means for imparting partial rotation to the sleeve 23 to which the meat scoop 24 and its arm portion 22 are attached. This separate driving means includes a gear 36 on the sleeve 23 which is engaged with a gear 37 secured to a stub shaft 38 in a depending bracket 39 attached to the transverse beam 18. A bevel gear 40 on the other end of the stub shaft 38 meshes with a second bevel gear 41 on the upper end of a vertical drive shaft 42 which extends downwardly between the pans 11 where another pair of bevel gears 43 and 44 receive movement from a horizontally disposed shaft 45 which connects with a cam actuated crank as best seen in FIGURE 4 of the drawings.

It will thus be seen that each of the stirring rods 19 swings through a 150° arc, one end of which is horizontal so that the stirring rods are above the meat pans 11 which permits the pans to be moved into and out of the machine. The meat scoop 24 and its arm 22 are similarly arranged so that they also move to horizontal position above the pan 11 and either of the pans can thus be freely moved into and out of the machine at such time.

Still referring to FIGURE 3 of the drawings, it will be observed that the stirring rods 19 and the meat scoop 24 and its arm 22 are detachably connected to the members on the shaft 14 and sleeves 21 and 23 respectively so that they can easily be removed and cleaned and replaced as will obviously be desirable. The meat in the pans 11 is cooked in particle form and maintained in that form by the intermittent motion of the stirring rods 19 and the meat scoop 24 on its supporting arm 22 is thus able to scoop up a given quantity of the meat particles whenever it moves in its scooping motion through the pan 11.

Figure 9:
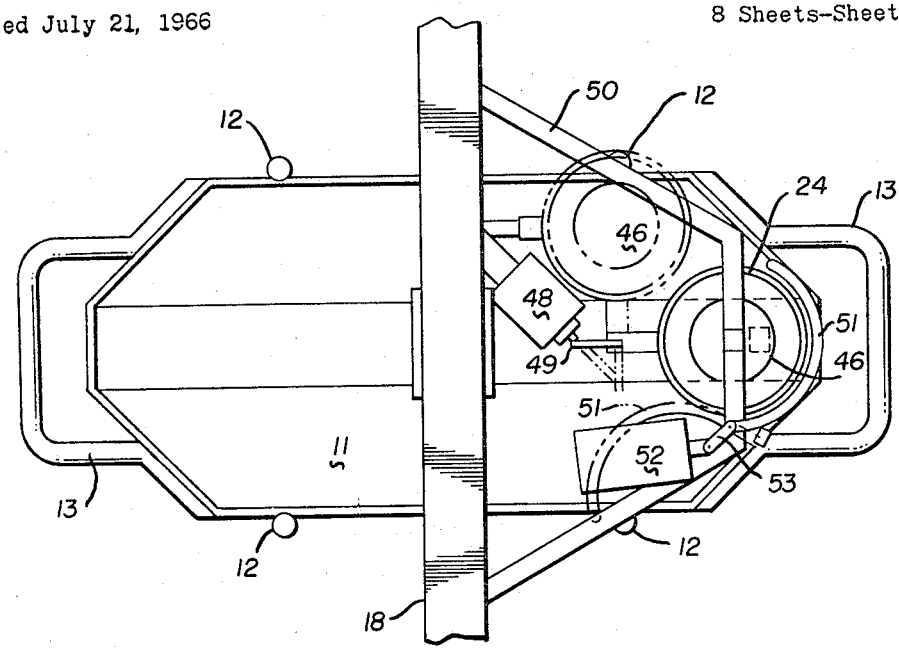
FIGURE 9 is a top plan view of the meat shaping apparatus seen in FIGURE 8.
Figure 8:
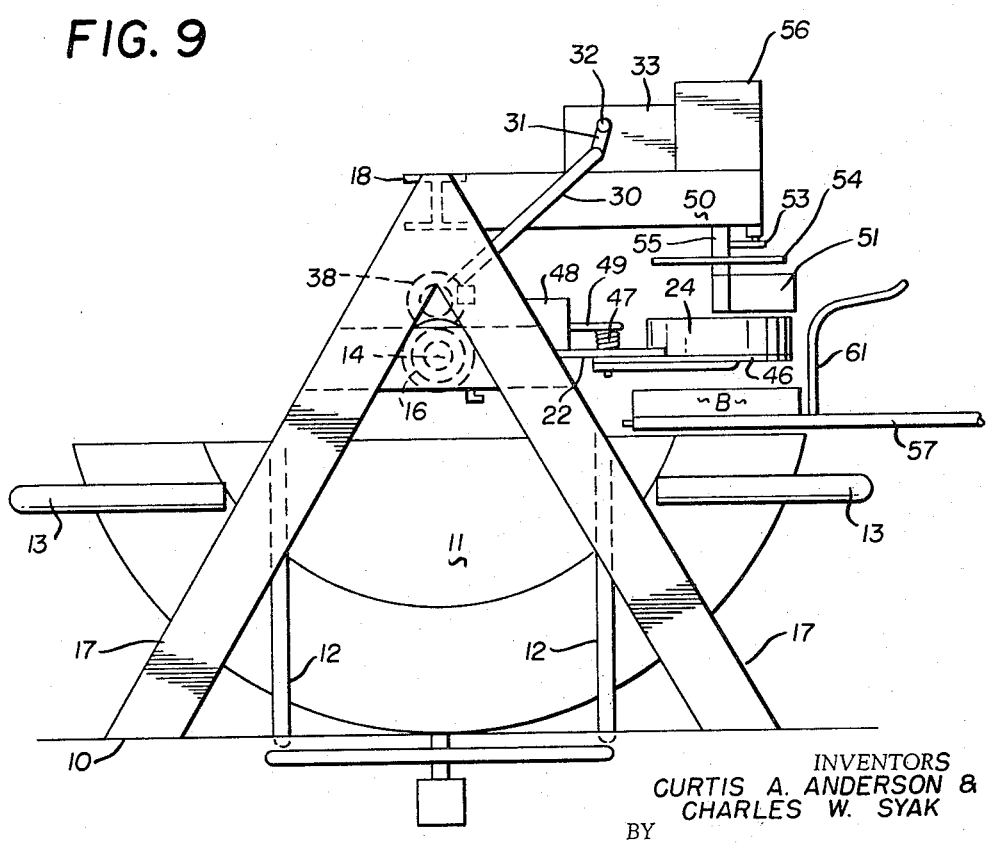
FIGURE 8 is a side elevation of a portion of the sandwich forming machine seen in FIGURE 1 of the drawings and illustrating the meat shaping and compacting apparatus.

By referring to FIGURES 8 and 9 of the drawings, it will be seen that the meat scoop 24 has a movable bottom portion 46 pivotally secured to the supporting arm 22 and normally held in closed position with respect to the scoop 24 by a spring 47. A solenoid 48 is positioned so that the movable member thereof engages an extension 49 on the movable bottom 46 and thus is capable of swinging the movable bottom 46 out of registry with the meat scoop 24. The solenoid 48 is mounted on the transverse beam 18 and thus the described action of the bottom of the meat scoop 24 can only take place when the meat scoop is in horizontal position as seen in FIGURES 1, 8 and 9 of the drawings. The horizontal beam 18 is provided with a sidewardly extending subframe 50 which in addition to supporting the motor 33 heretofore referred to and comprising the power source for reciprocating the stirring rods 19 also supports a solenoid actuated strike off and compacting mechanism as best seen in FIGURES 8 and 9 of the drawings.

By referring thereto it will be seen that there is an arcuate strike off member 51 arranged to move in an arc across the top of the meat scoop 24 from a first position as shown in solid lines in FIGURES 8 and 9 to a second position as shown in broken lines in FIGURE 9 of the drawings. The strike off arm 51 is so arranged that it moves across the top of the meat scoop 24 and removes any excess meat thereon so that the same falls back into the pan 11 therebelow. The strike off arm 51 is moved by a solenoid 52 which moves an angular support arm 53 in one direction when the solenoid is energized and holds it in moved position until the meat in the meat scoop has been compacted and ejected as hereinafter described. The solenoid 52 which actuates the strike off arm 51 is energized by the closing of a switch engaged by the meat scoop arm 22 when it reaches horizontal position as seen in FIGURE 8 of the drawings. The meat scoop moves through a radius of approximately 135° most of which movement is in the pan 11 and so arranged that the return motion of the meat scoop 24 will not push the cooked meat particles out of the pan.

After the meat particles in the meat scoop 24 have been leveled by the operation of the strike off arm 51 as hereinbefore described, a compression plate 54 which is preferably perforated and supported on the end of a movable shaft 55 moves downwardly into engagement with the meat particles and compacts the same against the closed bottom 46 thereof. The compression plate 54 is moved by another solenoid 56 which is mounted on the frame 50 and it will be observed that the compression plate is slightly smaller in diameter than the meat scoop 24. The actuating solenoid 56 is energized by way of a time delay relay and a switch which is actuated by the strike off arm 51. Thus the operation of the strike off arm 51 controls the movement of the compression plate which first moves downwardly and compresses the meat particles in the scoop. The time delay relay in the circuit holds the solenoid energized and thus maintains pressure on the meat particles for approximately one second whereupon the relay opens and the compression plate rises to its original position. The return of the compression plate to its original position closes the switch which in turn controls the solenoid 48 which is then actuated and swings open the bottom 46 of the meat scoop 24.

The opening of the meat scoop bottom 46 moves the switch which again energizes the solenoid 56 and moves the compression plate downwardly, this time going through the full stroke of the solenoid as the compacted meat patty previously formed by the action of the compression plate is pushed downwardly and out of the open bottom of the meat scoop 24 and onto a half of a bun which in the meantime has moved into position therebelow as hereinafter described.

When the compression plate 54 moves to its uppermost position after having ejected the meat as just described, it trips the actuating switch which controls the solenoid 48, deenergizing the same, which permits the spring-urged bottom 46 to swing back in position on the meat scoop which is then ready to recycle.

In order that a bun may be in position below the meat scoop when the foregoing described meat compacting and ejection operations take place an assembly arm 57 mounted for rotary motion by a shaft 58 on the supporting structure 10 is arranged to receive a bun B, lift the previously cut top half of the bun to a vertical position alongside the lower half thereof and move the lower half of the bun into position beneath the meat scoop 24.

By referring to FIGURES 1 and 2 of the drawings, the position of the assembly arm 57 with respect to the other parts of the sandwich making machine may be seen and by referring to FIGURE 2 of the drawings, it will be observed that the ends of the assembly arm 57 are circular and thereby particularly suited to receive buns B from a bun dispensing portion of the machine also seen in FIGURE 2 of the drawings and more specifically from one of a plurality of vertical cylindrical containers 59 each of which holds a plurality of previously sliced hamburger buns. The plurality of cylindrical containers 59 that hold the previously sliced buns B are mounted on a unitary frame as hereinafter described so that the assembly of cylindrical containers may be rotated to bring one of the same into proper position for depositing a previously cut bun on one of the circular ends of the assembly arm 57.

Still referring to FIGURE 2 of the drawings, it will be seen that there is a conveyor belt 60 positioned alongside the cylindrical bun dispensers 59 and in a position so that when a hamburger has been completed and positioned on one of the ends of the assembly arm 57 motion of the arm 57 will move the hamburger sandwich to a position adjacent one end of the conveyor belt 60 whereupon an arm will engage the hamburger and move it onto the belt 60 which then conveys it out of the machine.

Figure 6:
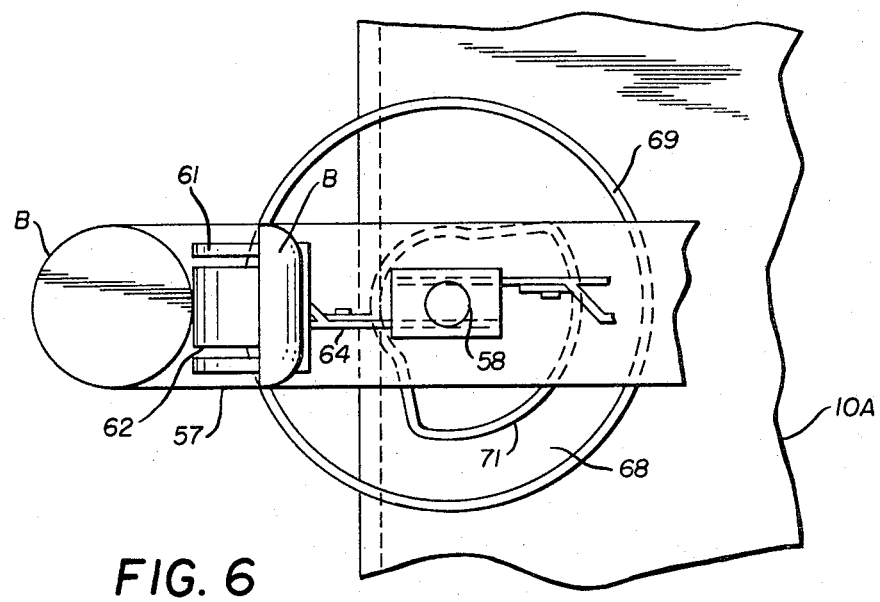
FIGURE 6 is a top plan view on line 6—6 of FIGURE 5.
Figure 5:
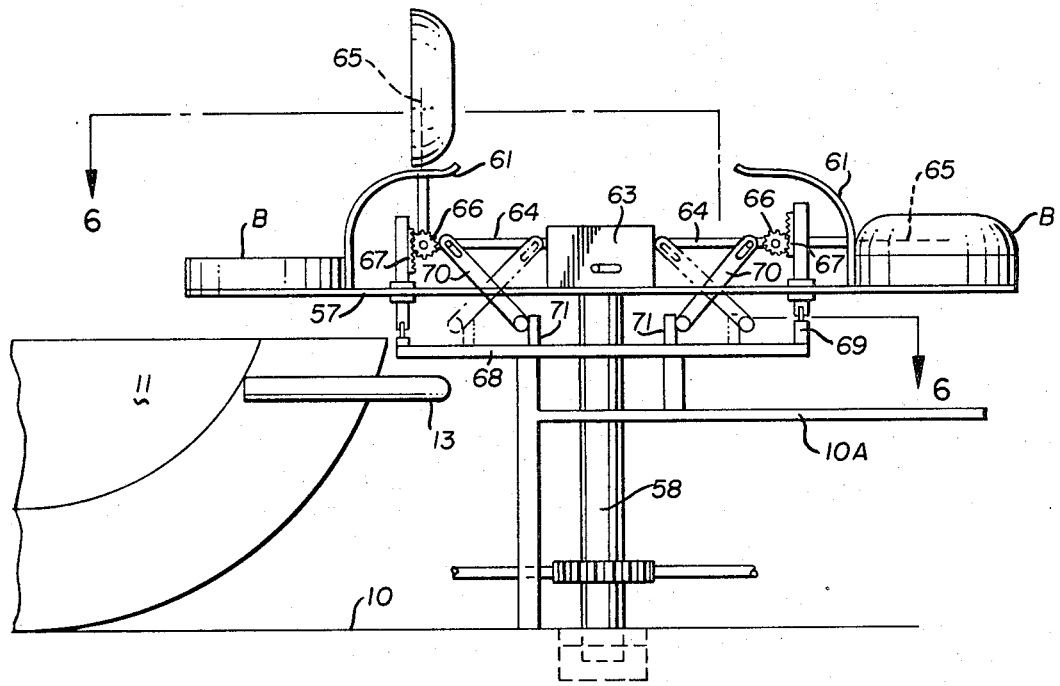
FIGURE 5 is a side elevation of the sandwich assembly arm which moves the previously split buns from a dispensing section to the meat filling section of the machine.

By referring now to FIGURES 5 and 6 of the drawings, the construction of the assembly arm 57 and particularly with respect to the apparatus thereon for pinning and lifting part of the precut bun may be seen. Each end of the assembly arm 57 is provided with an upstanding arcuate shield 61 which has a pair of spaced slots therein as indicated at 62 in FIGURE 6 of the drawings. A centrally positioned body member 63 supports a pair of oppositely disposed tubes 64 which are positioned in parallel spaced relation to the assembly arm 57 and each of which has Y-shaped end configuration as best seen in FIGURE 6 of the drawings and each of which has a pair of flexible pins 65 movably mounted therein in telescopic relation thereto. Each of the tubes 64 is hinged inwardly from its Y-shaped end and the hinged portion is provided with a pinion 66 which is engaged on a vertical rack 67 which is movable vertically by a cam disc 68 positioned therebelow and specifically a cam track 69 thereon. The inner ends of the flexible pins 65 extend transversely through slots in the tubes 64 and are engaged by motion imparting levers 70 which are shown in pin extending position in solid lines in FIGURE 5 of the drawings and in pin retracting position in broken lines. A secondary cam track 71 is positioned on the cam disc 68 and the lower ends of the levers 70 are engaged thereagainst.

Still referring to FIGURE 5 of the drawings, it will be observed that the cam disc 68 is stationary and that the cam action imparting vertical movement to the racks 67 and hence movement from horizontal to vertical on the part of the pins 65 as well as the reciprocable movement of the pins 65 is provided by the rotary motion of the assembly arm 57 as occasioned by its supporting rotatable shaft 58. In FIGURE 5 of the drawings a presliced bun is shown positioned on each end of the assembly arm 57 the bun B on the right end is shown in the top half thereof while the bun on the left end is shown with the pins 65 engaged in the top half thereof and moved to elevated vertical position thereby.

It will occur to those skilled in the art that the bun B is presented to the meat scoop 24 and the meat patty positioned thereon while the bun is opened and the one part thereof in elevated vertical position as just described.

Figure 10:
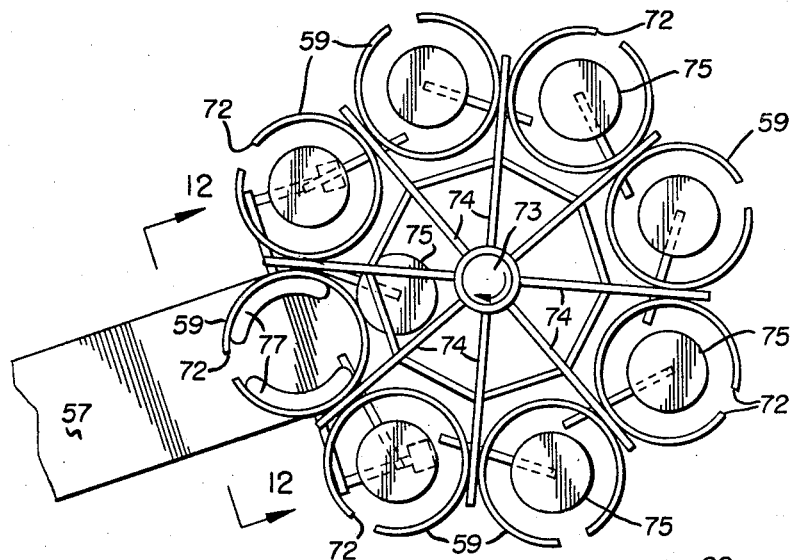
FIGURE 10 is a top plan view of the bun supplying portion of the sandwich making machine seen in FIGURE 1.
Figure 12:
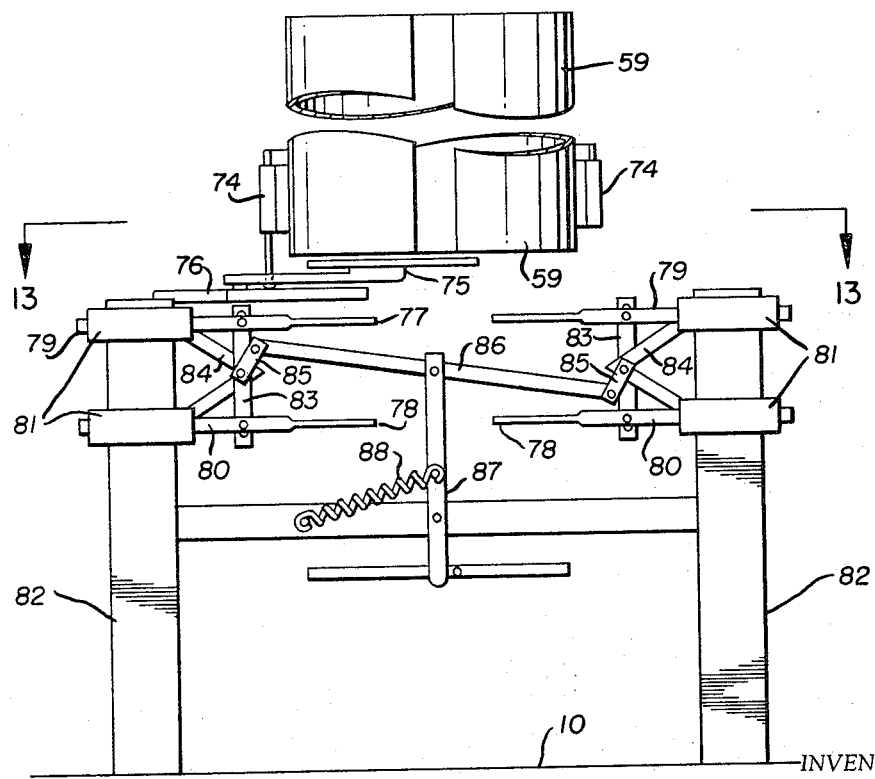
FIGURE 12 is a side elevation of the bun controlling mechanism for feeding individual buns from one portion of the machine to another with parts broken away.

In order that the buns may be automatically supplied to the assembly arm 57 the sliced buns are first positioned in stacks in the cylindrical containers 59 of the bun supplying portion of the machine which has heretofore been referred to. By referring now to FIGURES 1 and 2 of the drawings, it will be observed that the bun supplying portion is located to one side of the parts of the machine just described and consists of a plurality of cylindrical containers 59, each of which is provided with a vertical slot 72 and all of which are mounted on a centrally disposed vertical shaft 73 by means of a cage like frame 74 which is best illustrated in FIGURE 10 of the drawings. The cylindrical containers 59 are preferably plastic tubes clipped to the ends of the arms which form the frame 74 so that they can be removed therefrom. The presliced buns are stacked manually in the cylindrical containers 59 and each of the containers 59 has a bottom plate and arm 75 pivoted to the frame 74 and spring loaded to normally closed position. The arm portion of the bottom plate and arm 75 extends beyond the pivots which supports it on the frame 74 and is positioned for contact with a fixed bar 76 which is positioned on the bun dropping mechanism therebelow. Upon engagement of the arm portion of the bottom plate and arm 75 with the fixed bar 76, the bottom plate and arm 75 swings to open position and buns in the cylindrical container 59 which has now been opened drop downwardly onto a pair of opposed arcuate members 77 which are positioned directly above a secondary pair of similarly formed arcuate members 78 as best seen in FIGURE 12 of the drawings. The opposed pairs of arcuate members 77 and 78 are arranged on the ends of shafts 79 and 80, respectively, and the shafts 79 and 80 are slidably supported by apertured blocks 81 which are in turn supported on a frame 82 positioned upon the support 10. Links 83 pivotally engage the shafts 79 and 80 adjacent their opposite ends and are pivoted between their ends to brackets 84 by cranks 85 which are secured to the links 83. The cranks 85 are pivotally attached to the opposite ends of a rocker arm 86. A lever 87 pivoted inwardly from its ends to a portion of the frame 82 extends to a point where it will be engaged and moved by pins located in each end of the assembly arm 57. A spring 88 normally biases the lever 87 in one direction. The arrangement is such that a first bun dropping out of the cylindrical container 59 moves downwardly to rest upon the arcuate members 78 which are in closely spaced position. When a pin in one end of the assembly arm 57 engages the lever 87 and moves it, the rocker arm 86 and the cranks 85 impart opposite motion to the links 83 and cause the arcuate members 78 to move away from one another and drop the bun on the assembly arm 57 while the upper pair of arcuate members 77 move toward one another to hold the next bun until the spring 88 retracts the members 77.

Figure 13:
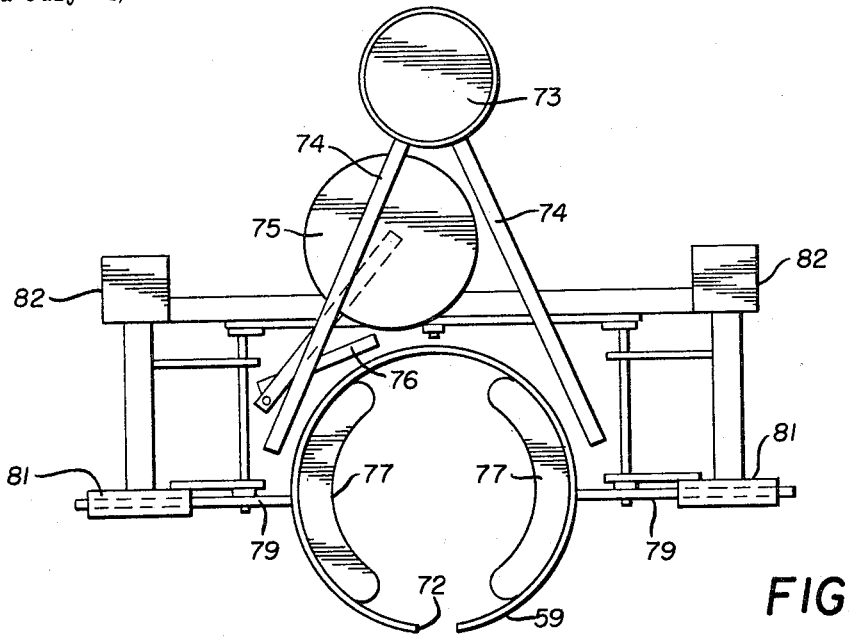
FIGURE 13 is a top plan view on line 13—13 of FIGURE 12.

It will be observed that FIGURES 12 and 13 of the drawings show the arcuate members 77 and 78 in intermediate position.

Figure 11:
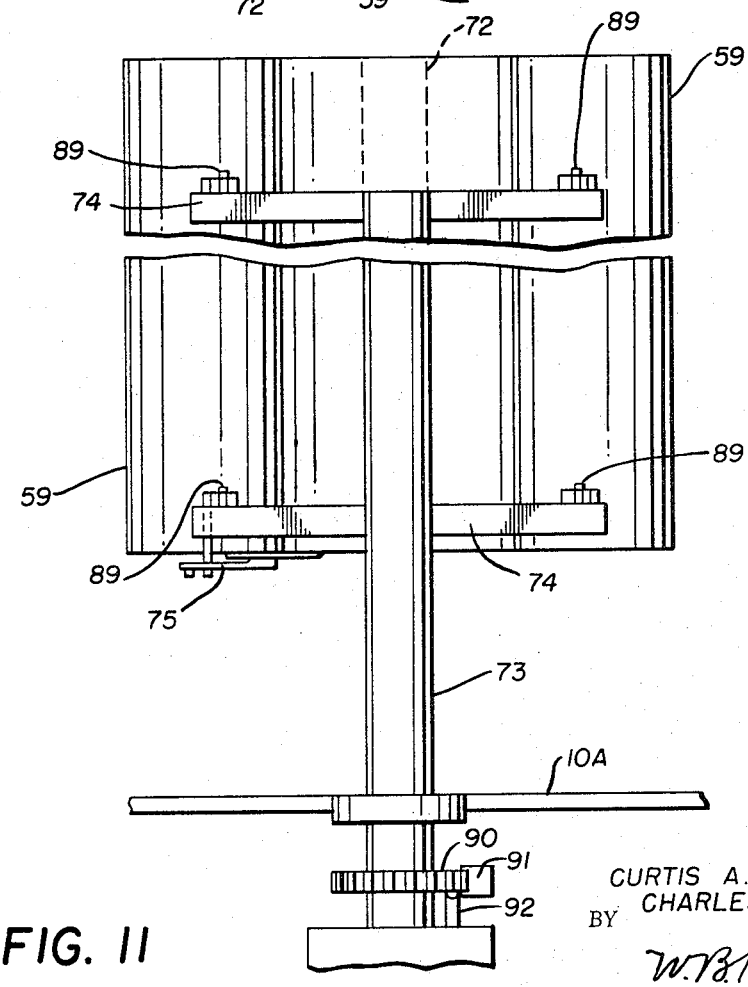
FIGURE 11 is a side elevational view of the bun supplying portion of the machine illustrated in FIGURE 10 with parts broken away.

By referring now to FIGURE 11 of the drawings, it will be seen that the shaft 73 which mounts the rotatable assembly of cylindrical containers 59 in which the buns are positioned is illustrated in enlarged scale as compared with FIGURE 10 which is a top view of the assembly and in FIGURE 11 one of the cylindrical containers 59 is shown detachably secured by clips 89 to a pair of vertically spaced frame members 74 of the rotatable frame heretofore described. The lower end of the shaft 73 extends through a suitable bearing in the support structure 10 and has a ratchet gear 90 secured thereto and positioned for registry with a movable portion 91 of a solenoid which is used to rotate the shaft 73 and the cylindrical containers 59 thereon. A spring urged detent 92 engages indexing openings in the ratchet gear 90 so as to insure the positioning of one of the cylindrical containers 59 over the end of the assembly arm 57 heretofore described.

By referring now to FIGURE 2 of the drawings, it will be seen that the part 91 of the solenoid which is positioned adjacent the ratchet gear 90 is an enlarged extension of a solenoid shaft 93 which extends to the actual solenoid coil 94. FIGURE 2 of the drawings symbolically locates the plurality of circumferentially spaced cylindrical containers 59 and also illustrates the placement of a driving motor 95 which moves the endless belt 60 heretofore described and FIGURE 1 also indicates the location of a main driving motor 96.

By referring now to FIGURE 4 of the drawings, the driving motor 96 may be seen to be provided with a drive shaft 97 having a spur gear 98 thereon engaged with a secondary gear 99 on the end of a driven shaft 100. A worm gear 101 on the shaft 100 engages a matching gear 102 on the shaft 58 which rotates the assembly arm 57 heretofore described. The shaft 100 is journalled in supports 103 which have suitable bearings therein. Another gear 104 is positioned on the shaft 100 and engages a relatively larger gear 105 on a shaft 106 parallel with the shaft 101 and which shaft 106 is supported by support members 107. The gears 104 and 105 act as a reduction gear relative to a bevel gear 108 also on the shaft 106 which is engaged in a matching bevel gear 109 on the end of a right angularly disposed shaft 110. A cylindrical cam 111 is positioned on the shaft 110 which shaft is supported on support members 112. A cam track 113 on the cylindrical cam 111 is engaged by a cam follower 114 on a reciprocably mounted shaft 115 which in turn is slidably positioned in support members 116. A crank 117 on one end of the shaft 115 imparts rotary motion to a wheel 118 on the end of shaft 45 heretofore referred to and which is supported by supports 119. The shaft 45 thus imparts controlled cycled rotary motion to the shaft 42 and this motion in turn is used to control the meat scoop 24 and its operation in forming the meat patty as hereinbefore described in connection with FIGURES 1, 3, 8 and 9 of the drawings.

It will thus be seen that a food dispensing device and more particularly a machine which will prepare sandwiches such as hamburger sandwiches and deliver them ready to be served has been disclosed herein. It will be observed that it will be necessary to provide for the proper cycling of the various parts of the machine as hereinbefore described in order that the same can and will be effective. The stirring rods 19, two of which reciprocate in one of the pans 11 and the other of which simply moves back and forth in one of the pans 11 operate continuously while there is meat in the pans and it will be obvious to those skilled in the art that proper cooking temperature is achieved by the heating means in one of the pans while warming temperature is maintained by the heating means in the meat pan in position beneath the meat scoop 24. In operating the device the operator must engage a master control switch (not shown) which energizes the principal driving motor 96. This immediately causes the assembly arm 57 to rotate to bring one end thereof beneath one of the cylindrical containers 59 in which the presliced buns are positioned. The action of the end of the assembly arm 57 in moving into position for receiving the bun causes the bun to be positioned thereon as hereinbefore described and the arm moves on around to simultaneously inject the pins 65 into the top half of the precut buns and elevates the top half of the bun as previously described. While this is occurring, the same driving motion has operated the cylindrical meat scoop control cam and the motion thereof have been imparted to the meat scoop which swings downwardly through the meat pan 11 therebelow and then returns scooping up a desirable quantity of the precooked meat particles. When it reaches horizontal position, the compression plate moves downwardly to compress the meat particles therein into a patty and subsequently retracts while the bottom of the meat scoop swings open. The compression plate then again moves downwardly to expel the meat patty from the meat scoop and place it on the bun which has moved into position therebeneath. The assembly arm 57 continues to turn. The top pinned portion of the bun moves downwardly in accordance with the cams on the cam disc beneath the arm 57 and the bun now complete with the meat patty therein is engaged the pivoted arm alongside the conveyor belt 60 and moved onto the same. The belt delivers the hamburger to the operator.

As long as there are buns in one of the containers 59 the mechanism therebeneath which receives the buns therefrom and deposits them on the end of the assembly arm 57 will continue to operate and at such time as no bun drops out of the cylindrical container onto this mechanism micro-switches thereon will actuate the solenoid 94 and rotate the assembly of cylindrical containers 59 to bring a new container and a new supply of buns into proper position. It will be seen that the several parts of the food dispensing device are interdependent in that the object of the invention is the formation of a meat sandwich such as a hamburger on a presliced bun. The various parts of the food dispensing device are held in desired assembly by quick release means so that they can be detached and replaced with alternate cleaned parts when encessary.

It will thus be seen that a food dispensing device and more particularly a machine which will prepare meat sandwiches such as hamburgers has been disclosed and that the disclosed device meets the several objects of the invention. Having thus described our invention, what we claim is:

1. A sandwich making machine having at least one heated receptacle for sandwich filling in flake or particle form, means for stirring the sandwich filling in said receptacle and a device swingable in an arc based above said receptacle for collecting a portion of said sandwich filling and moving the same out of said receptacle, means movable into and out of said device for compressing said sandwich filling therein and expelling it therefrom, a rotary device for receiving a bun, means on said rotary device for engaging and elevating a portion of said bun relative to another portion, said rotary device positioned so as to move said bun beneath said compressing and expelling means for receiving said sandwich filling and subsequently removing said sandwich therefrom.

2. The sandwich making machine set forth in claim 1 wherein the means for stirring the sandwich filling in the receptacle comprises a U-shaped stirring rod swingable in an arc based above said receptacle.

3. The sandwich making machine set forth in claim 1 and wherein the device for collecting a portion of the sandwich filling comprises an arm having a circular scoop on the end thereof and wherein the portion of the arm forming the bottom of the scoop is removably positioned on said arm.

4. The sandwich making machine set forth in claim 1 and wherein the means for compressing the sandwich filling comprises a disc, a vertical shaft supporting said disc and a source of vertical motion for moving said shaft and disc vertically.

5. The sandwich making machine set forth in claim 1 and wherein the device for receiving a bun comprises an assembly arm pivoted in said machine midway between its ends.

6. The sandwich making machine set forth in claim 1 and wherein the means on the said rotary device for engaging and elevating a portion of said bun includes pins movable relative to said device and said bun and pivots in said pins and means for moving said pins from horizontal to vertical position.

7. A sandwich making machine having at least one heated receptacle for sandwich filling in flake or particle form, means for stirring the sandwich filling in said receptacle and a device swingable in an arc based above said receptacle for collecting a portion of said sandwich filling and moving the same out of said receptacle, means movable into and out of said device for compressing said sandwich filling therein and expelling it therefrom, a rotary device for receiving a bun, a secondary rotary device for supplying presliced buns to said sandwich making machine, said secondary rotary device including at least one cylindrical container, means for moving said secondary rotary device to bring said cylindrical container into position above said bun receiving rotary device, means on said secondary rotary device for dispensing one bun from said cylindrical container to said bun receiving rotary device, means on said bun receiving rotary device for engaging and elevating a portion of said bun relative to another portion, said bun receiving rotary device positioned so as to move said bun beneath said compressing and expelling means for receiving said sandwich filling and subsequently removing said sandwich therefrom.

8. The sandwich making machine set forth in claim 7 and wherein said means on said secondary rotary device for dispensing a bun comprises superimposed pairs of horizontally movable arms, levers interconnecting said arms and means for moving said levers in oppositely disposed relation actuated by said rotary device.

References Cited
UNITED STATES PATENTS

| | | | |
|---|---|---|---|
| 1,755,699 | 4/1930 | Loehr | 107—1 |
| 2,337,117 | 12/1943 | Lloyd | 107—1 |
| 3,019,744 | 2/1962 | Carvel | 107—1 |
| 3,266,442 | 8/1966 | Udall et al. | 107—1 |

WILLIAM I. PRICE, *Primary Examiner.*

J. SHEA, *Assistant Examiner.*